United States Patent [19]

Murakami et al.

[11] Patent Number: 4,749,514
[45] Date of Patent: Jun. 7, 1988

[54] GRAPHITE INTERCALATION COMPOUND FILM AND METHOD OF PREPARING THE SAME

[75] Inventors: Mutsuaki Murakami, Machida; Kazuhiro Watanabe, Kawasaki; Susumu Yoshimura, Yokohama, all of Japan

[73] Assignees: Research Development Corp. of Japan, Tokyo; Matsushita Elec. Industrial Co. Ltd., Osaka, both of Japan

[21] Appl. No.: 914,922

[22] Filed: Oct. 3, 1986

[30] Foreign Application Priority Data

Oct. 12, 1985 [JP] Japan .................. 60-225997

[51] Int. Cl.$^4$ .................. H01B 1/00; H01B 1/02
[52] U.S. Cl. .................. 252/500; 252/512; 252/518; 252/519; 423/449; 423/460; 528/503; 428/408
[58] Field of Search .......... 252/500, 512, 513, 502, 252/518, 517, 519, 521, 511; 423/448, 449, 460; 528/422, 423, 481, 490, 502, 503, 491; 428/367, 408

[56] References Cited

U.S. PATENT DOCUMENTS

| | | | |
|---|---|---|---|
| 4,213,956 | 7/1980 | Ubbelohde | 423/448 |
| 4,461,719 | 7/1984 | Vogel et al. | 423/448 |
| 4,515,709 | 5/1985 | Watanabe et al. | 252/502 |
| 4,565,649 | 1/1986 | Vogel | 423/460 |
| 4,599,193 | 7/1986 | Murase et al. | 252/500 |
| 4,608,192 | 8/1986 | Su | 252/518 |
| 4,620,943 | 11/1986 | Denisevich et al. | 252/500 |
| 4,632,775 | 12/1986 | Kalnin et al. | 423/449 |
| 4,645,620 | 2/1987 | Palchan et al. | 252/502 |

FOREIGN PATENT DOCUMENTS 59-105029 6/1984 Japan.
60-115415 5/1985 Japan.

OTHER PUBLICATIONS

Dresselhause et al., M. S. *Advances in Physics*, 1981, vol. 30, No. 2, pp. 140–154.
Ottmers et al., D. M., *Carbon* 1966, vol. 4, pp. 125–127.
Craven et al., W. E., *Carbon* 1966, vol. 4, pp. 223–226.
Sasa et al., T., *Carbon* 1971, vol. 9, pp. 407–416.
Stumpp, E., *Materials Science and Engineering*, 31 (1977), pp. 53–59.
Thompson et al., T. E., *Carbon*, 1977, vol. 15, pp. 39–43.
Fuzellier et al., H., *Carbon*, vol. 17, pp. 255–257.
Watanage et al., K., *Proc. R. Soc. Lond. A.* 333, pp. 51–67.
Vol'pin et al., M. E., *Journal of the American Chemical Society*, 97:12, pp. 3366–3373.
Bottomley et al., M. J., *Electrochemical*, pp. 5674–5680.

*Primary Examiner*—Josephine Barr
*Attorney, Agent, or Firm*—Stephen F. K. Yee

[57] ABSTRACT

This invention relates to a graphite intercalation compound in the form of a film, which is obtained by intercalating a donor type, an acceptor type or a covalent type material between the layers of graphite film obtained by thermal treatment of poly(phenylene oxadiazole). The obtained intercalated graphite film has a large scale area and has an extremely improved stability compared with known graphite intercalation compounds.

5 Claims, 2 Drawing Sheets

1: Alkali Metal
2: GPOD
Ti: Temperature of Intercalant
Tg: Temperature of GPOD

1: Alkali Metal
2: GPOD
Ti: Temperature of Intercalant
Tg: Temperature of GPOD

1: Intercalant
2: GPOD
3: Four Terminal Electrodes (Platinum)
4: TEFLON Needle Valve
5: Vacuum Tap
6: Exhaust System

GRAPHITE INTERCALATION COMPOUND FILM AND METHOD OF PREPARING THE SAME

BACKGROUND OF THE INVENTION

This invention relates to a graphite intercalation compound in the form of a film which is stable and elastic in nature and which is useful for utilization as a highly electrically conducting material, a superconducting material, an electric cell material, a chemical reagent, a catalyst for organic reactions, a gas storage and gas concentration material, a raw material for the production of expanded graphite, a lubricant, etc. The present invention is also concerned with a method of preparing such a graphite intercalation compound.

In graphite carbon atoms are arranged in planar layers each in the form of a regular hexagonal network. A graphite intercalation compound is a compound in which the carbon layers are intercalated or inserted with an intercalant such as molecules, ions or atoms. Graphite intercalation compounds are characterized by their variety of composition and structural and contain as their intercalants various chemical species including elements such as alkali metals and halogens and compounds such as organic halides, acids and ammonia. Even the same intercalant can give graphite intercalation compounds with different interposition structures (stage structures) or different compositions depending upon the reaction conditions under which the intercalation compounds are prepared. Graphite intercalation compounds may be broadly classified into two groups according to the type of interaction between the guest compound (intercalant) and the host graphite between the layers of which the guest is intercalated. The first group is of a type in which charge transfer occurs between the intercalant and graphite so that there is an electrostatic attractive force between them. The second group is of a type in which the intercalant and carbon atoms are bound covalently (covalent bond type). The charge transfer type graphite intercalation compounds may be further classified into a donor type in which the intercalant is an electron donor to the graphite layers and an acceptor type in which the intercalant is an electron acceptor A number of proposals have been made for the utilization of intercalated graphite compounds because of their variety. For example, graphite intercalation compounds containing as intercalants $AsF_5$, $SbF_5$, $HNO_3$, $FeCl_3$, $CuCl_2$, $H_2SO_4$ and $SO_3^-$ are proposed to be used as light weight, highly electrically conducting materials because of their electrical conductivity comparable to copper. There are proposals to use K-, Rb- and Cs-containing graphite intercalation compounds as superconducting materials, $(CF)_n$- and $(C_2F)_n$-containing graphite intercalation compounds as primary battery materials, K- and $NiCl_2$-containing graphite intercalation compounds as secondary battery materials and $Br_2$-containing intercalation compounds as temperature difference cells. Graphite intercalation compounds are also proposed to be used as reagents and catalyst for organic reactions and as materials for the storage and concentration of gases. For instance, intercalation compounds of K and Li are expected to be used as reagents for polymerization, those of $Br_2$, $SbCl_5$ and $AsF_5$ as reagents for halogen-participating reactions, those of K and K-$FeCl_3$ as catalysts for ammonia synthesis, those of $H_2SO_4$ as reagents for esterification and those of K as hydrogen-storage of hydrogen-concentration materials. Additionally, graphite intercalation compounds having $H_2SO_4$ and $HNO_3$ are suggested to be used as a raw material for expand graphite, those having F as a lubricant and those having Fe, Co and Ni as a catalyst for diamond synthesis.

In spite of the various attractive properties of graphite intercaltion compounds, however, they are not actually utilized in practice at present except in only a few fields because of the following two fundamental problems involved therein.

The first problem in the conventional graphite intercalation compounds is difficulty of obtaining of suitable host graphite. In the preparation of a graphite intercalation compound, the degree of graphitization of the host graphite is one of the important parameters, i.e. a higher degree of graphitization is more preferable for the formation of intercalation compounds. Thus, natural graphite, Kish graphite or highly oriented, thermal cracking graphite, which has a high degree of graphitization, has been used for the preparation of intercalation compounds with excellent properties. However, such graphite is in the form of a block or minute lammelas and is very expensive. Since host graphite materials with both a high degree of graphitization and a large area like films are not available at present, graphite intercalation compounds of desired shape and properties are failed to be manufactured.

The second problem is related to the stability of graphite intercalation compounds. Namely known intercalation compounds are unstable and easily decomposed in air, though the degree of unstability varies with the type of the intercalant and with the degree of graphitization of the host graphite. A diversity of proposals have been made to improve the stability of graphite intercalation compounds, but they are still unsatisfactory.

SUMMARY OF THE INVENTION

The present invention has been made with the foregoing problems of known intercalated graphite compounds in view and provides a graphite intercalation compound including an intercalant between the layers of a high grade graphite film obtained by heat treatment of a specific polymer film in vacuum or in an inert gas atmosphere. The novel intercalated graphite compound is in the form of a film or sheet with a large surface area and has an extremely improved stability irrespective of the kind of the intercalant.

In accordance with the present invention there is provided an intercalated graphite product which includes an intercalant of a donor type, acceptor type or a covalent bond type inserted between the layers of a substantially graphitized film obtained by thermally treating a polyphenyleneoxadiazole film at a temperature of at least 1600° C.

The intercalants of a donor type include, for example, Li, K, Rb, Cs, Ba, Ca, Mn, Fe, Ni, Co, Cu, Mo, K—$NH_3$, Li—$NH_3$, Rb—$NH_3$, Cs—$NH_3$, Ba—$NH_3$, Ca—$NH_3$, K—H, K—D, Li—THF, Na—THF, K—THF, K—$C_6H_6$, K—DMSO. Examples of the intercalants of an acceptor type include Br, ICl, IBr, $MnCl_2$, $MoCl_2$, $FeCl_2$, $FeCl_3$, $CuCl_2$, $NiCl_2$, $NbCl_5$, $UCl_5$, $AlCl_3$, $AsF_5$, $SbF_5$, $HNO_3$, $H_2SO_4$, $SO_3^-$, $HClO_4$ and HF. Examples of the intercalants of a covalent bond type include F and O·(OH).

In another aspect, the present invention provides a method of preparing a graphite intercalation compound, which comprises the steps of:

Heat treating a polyphenyleneoxadiazole film at a temperature of at least 1600° C. to obtain a substantially graphitized film, and Inserting an intercalant of a donor type, acceptor type or a covalent bond type between the layers of the graphitized film.

BRIEF DESCRIPTION OF THE DRAWINGS

Other objects, features and advantages of the present invention will become apparent from the detailed description of the invention which follows in light of the accompanying drawings, in which.

DETAILED DESCRIPTION OF THE INVENTION

Figure 1:
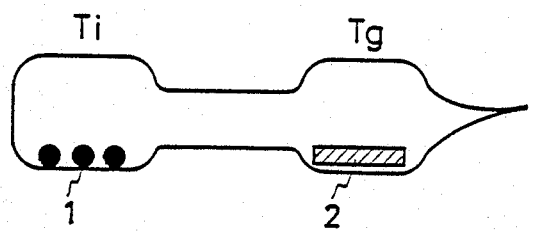
FIG. 1 is a schematic illustration of a divice useful for carrying out a two-valve method for the preparation of graphite intercalation compounds according to the present invention.

The present inventor has disclosed that poly(p-phenylene-1,3,4-oxadiazole) (hereinafter referred to as POD) may be converted into a highly electrically conducting, nitrogen-containing, condensed polycyclic structure when heated at a temperature of 520°–1400° C. in vacuum or in an atmosphere of an inert gas (Japanese Published Unexamined Patent Application No.59-105029). It has been further found, as described in Japanese Patent Application No. 60-115415, that the heat treated POD may be more easily graphitized at a temperature of at least 1600° C., preferably above 1800° C. than any known polymeric material. In the present invention graphite films obtained by the above proposed methods are used for the preparation of graphite intercalation compounds.

POD used as a starting material for the preparation of the graphite intercalation compounds according to the present invention is a well known heat resistant polymer and may be generally obtained by dehydrative cyclization of a poly hydrazide obtained by the polycondensation of terephthalic acid and hydrazine. The reaction of dimethyl terephthalate with hydrazine sulfate or reaction of terephthalyl chloride with hydrazine may also give POD. POD is soluble in concentrated sulfuric acid. Films obtained by casting of a sulfuric acid solution of POD have a high crystallinity because of the orderly orientation of the highly porous 1,3,4-oxadiazole rings attributable to dipole-dipole interaction therebetween. The ease by which POD is formed into a nitrogen-containing, condensed-polycyclic structure by heat treatment at 520°–1400° C. is apparently owed to its orderly orientation. The presence of the controlled condensed-polycyclic structure of the heat treated POD is considered to be responsible for its ease of graphitization. For this reason, it will be understood that various other isomers of POD can be used for the purpose of the present invention as long as they have a high crystallinity.

Illustrative of such isomers are poly(m-phenylene-1,3,4-oxadiazole), poly(p-phenylene-1,2,4-oxadiazole), poly(m-phenylene-1,2,4- oxadiazole), poly(o-phenylene-1,3,4-oxadiazole), poly(o-phenylene-1,2,4-oxadiazole) and copolymers thereof.

The graphite film used in the present invention may be prepared by heating the POD film at a temperature of at least 1600° C., preferably above 1800° C. The use of a higher temperature is more preferred since graphite with a high degree of graphitization may be obtained within a shorter period of time. Thus, the use of a temperature of 2000° C. or more is most preferable.

The heat treatment is preferably carried out under pressure and in the presence of a catalyst for the reasons of expediting graphitization. The pressure under which the POD film is graphitized may be 2kb-10kb or higher. The catalyst may be fine powders of one or more elements belonging to groups IVb-VIIb and VIII of the Periodic Table, such as Fe, Co, P, Sn, Ni and Sb. The catalyst is used in an amount of 2-20% based on the weight of POD. No additional merits may be obtained from an amount of the catalyst over 20 wt %. Rather, the use of such an excess amount of the catalyst causes aggregation and separation of the reactants.

The heat treatment is preferably performed in an atmosphere of an inert gas or in vacuum. The inert gas may be, for example, helium, argon or nitrogen gas.

By the heat treatment at high temperatures, POD is converted to have a condensed, polycyclic structure composed only of carbon as a result of the elimination of nitrogen atoms. Elemental analysis of the the heat treated product indicates that 4% of nitrogen is contained in the product for a heat treatment temperature of 1400° C., about 1% of nitrogen in the product obtained at 1600° C., and only 0.1% of nitrogen for 2000° C. or more. That is, the conversion of the nitrogencontaining, condensed-polycyclic structure of POD into substantially nitrogen-free structure, i.e. graphite, occurs in the temperature range of 1400-1600° C. In summarizing, the heat treated POD has two features. Firstly, at a temperature of about 2500° C. it is completely converted into graphite. Secondly, the temperature above which graphitization rapidly occurs is low, i.e. below 2000° C. The method for the preparation of POD graphite is featured in the capability of producing graphite of any desired shape by simple heat treatment.

The graphitized POD (hereinafter referred to as GPOD) is complete graphite and can be obtained in the form of a film with a large surface area. Thus, if GPOD allows the insertion of an intercalant, the resulting graphite intercalation compound will also be in the form of a film of a large surface area, so that the serious disadvantage of the conventional graphite intercalation compound that the compound obtained is only in the form of a block or minute lamellas will be overcome. The present invention provides intercalated GPOD products in the form of films or sheets.

A variety of methods may be adopted for the preparation of graphite intercalation compounds using GPOD. Suitable methods are, for example, as follows:

(1) Two-valve method (alkali metal):

A Pilex tube having two spaced apart valves is used. A GPOD film and an intercalant are placed in the two valves, respectively. After evacuation to vacuum, the tube is sealed and then heated for the vaporization of the intercalant. The vapors of the intercalant are thus contacted and reacted with the GPOD film to give an intercalated product. This method is applicable, for example, to the preparation of metal-GPOD intercalation compounds having various stage structures. Examples of the intercalating metals include alkali metals and alkaline earth metals such as K, Rb, Cs, Ca and Ba.

(2) Mixing method (alkali metal):

A GPOD film and an intercalant are heated and reacted with each other. The intercalant is generally in the form of a liquid or melt under the reaction conditions. This method is applicable to, for example, the preparation of a Li—GPOD intercalation compound.

(3) Solvent method (alkali metal):

An intercalant such as a metal or metal salt is dissolved or dispersed in a solvent, in which a GPOD film is then immersed for reaction. For example, using liquid ammonia as a solvent, a ternary system-GPOD intercalation compound inserted with K—$NH_3$, Li—$NH_3$, Rb—$NH_3$, Cs—$NH_3$, Ba—$NH_3$ or Ca—$NH_3$ could be manufactured. Using organic solvents such as naphthalene-tetrahydrofuran (THF), dimethyl sulfoxide (DMSO), benzophenone-THF, benzonitrile-THF, benzophenone-dimethoxyethane and hexamethylphosphamide, ternary system GPOD intercalation compounds such as $LiC_x(THF)_y$, $NaC_x(THF)_y$, $KC_x(THF)_y$ and $KC_x(DMSO)_y$ could be obtained.

(4) Vapor phase halogen method:

Halogen gas such as $F_2$, $Br_2$, ICl or IBr is directly contacted with a GPOD film to obtain a halogen-GPOD intercalation compound. Fluorinated graphite having peculiar structures could be obtained by this method.

(5) Two-valve method (metal halide):

In the same manner as described at (1) above, a metal halide such as $FeCl_3$, $CoCl_2$, $MnCl_2$, $NiCl_2$, $CuCl_2$ or $MoCl_5$ intercalated into a GPOD film to form a GPOD intercalation compound inserted with the halide.

(6) Solvent method (metal halide):

A metal halide is dissolved in a solvent, in which a GPOD film is then immersed for reaction. For example, using $CH_3NO_2$ as a solvent, $FeCl_3$-GPOD intercalation compound could be produced. Using $SOCl_2$ as a solvent, GPOD intercalation compounds inserted with $AlCl_3$, $NbCl_5$ and $UCl_5$ could be obtained.

(7) Vapor phase method (acid):

An intercalant such as $AsF_5$, $SbF_5$, $NO_3^-$ and $SO_3^-$ is frozen by cooling with liquid nitrogen in an atmosphere of dried argon. A GPOD film is set in the reactor at a location spaced apart from the solidified intercalant. The reactor is evacuated to vacuum and the liquid nitrogen bath is removed. The intercalant is vaporized and reacted with the GPOD as the temperature is returned to room temperature. This method is applicable to the synthesis of a GPOD intercalation compound inserted with $NO_3^-$, $SO_3^-$, $AsF_5$ or $SbF_5$.

(8) Liquid phase method (acid):

A GPOD film is reacted with a liquid reagent to form a GPOD intercalation compound. For example, by immersing a GPOD film in fuming nitric acid, concentrated sulfuric acid containing $CrO_3$ and $KMnO_4$ and $C_4O(OH)$, there could be obtained GPOD intercalation compounds inserted with $HNO_3$, $H_2SO_4$ and O(OH), respectively.

(9) Modification of K-GPOD intercalation compound:

A K-GPOD intercalation compound is converted by reaction with an additional intercalant such as hydrogen gas, deuterium gas or benzene, into a ternary-system compound, such as K-H-GPOD, K-D-GPOD or K-$C_6H_6$-GPOD.

(10) Reduction of metal halide-GPOD intercalation compound:

A metal halide-GPOD intercalation compound is reacted with a reducing agent such as $H_2$, K, Na-$NH_3$, $NaBH_4$ or $LiAlH_4$. This method is applicable to form GPOD intercalation compounds such as $FeCl_2$-GPOD, Fe-GPOD, Co-GPOD, Mn-GPOD, Ni-GPOD, Cu-GPOD or Mo-GPOD.

(11) Electrolysis method:

A GPOD film is subjected to anodic oxidation in an acid. This method is applicable to the formation of a GPOD intercalation compound inserted with $H_2SO_4$, $HClO_4$ or HF.

Various kinds of GPOD intercation compounds could be prepared in accordance with the methods (1)-(11) described above. The stage index of the graphite intercalation compounds can be determined by X-ray diffraction patterns, quantitative analysis and elemental analysis. The stage index represents the state of intercalation. That is, a graphite intercalation compound in which the intercalant is inserted between every layer of carbon atoms of the graphite is defined as being in "first stage" or "stage 1", a graphite intercalation compound having an intercalant inserted between alternate layers is defined as being in "second stage" or "stage 2", and a graphite intercalation compound having an intercalant inserted between every three layers is defined as being in "third stage" or "stage 3". Similarly, an "n-th stage" or "stage n" graphite intercalation compound has an intercalant inserted between every n-th interlayer. The stage index is one of the important parameters determining the properties of the graphite intercalation compounds.

The stability of the intercalated graphite compounds can be determined in terms of electric conductivity. Thus, a graphite intercalation compound whose electrical conductivity does not change when exposed to air is regarded as being "stable" while an intercalation compound showing a change in electrical conductivity upon being left in air is regarded as being "unstable". The stability may be assessed in terms of the rate of reduction of electrical conductivity. For the purpose of the present specification, since the stability of the intercalation compound varies with the kind of the intercalant, the stability is expressed in terms of relative reduction rate of the electrical conductivity, i.e. ratio of the rate of reduction of electrical conductivity of the sample to that of a standard intercalation compound which is a Kish graphite intercalation compound obtained in the same manner as that of the sample except that Kish graphite (hereinafter referred to as KG) is used in place of GPOD.

The graphite intercalation compound according to present invention is much more stable than known intercalation compounds in which KG is used as host graphite. For example, the electrical conductivity of K-KG intercalation compound begins to decrease as soon as it is exposed to air. In contrast, corresponding K-GPOD intercalation compound according to the present invention is very stable, i.e. the reduction rate of electrical conductivity is only 1/12.5 of that of the K-KG intercalation compound. The electrical conductivity of Br-KG intercalation compound gradually decreases when exposed to air. On the other hand, the rate of the reduction of electrical conductivity of Br-GPOD interclation compound is only 1/40 of that of the Br-KG intercalation compound.

EXAMPLES

The following examples will further illustrate the present invention. In the examples, the stage number is determined by X-ray diffraction patterns using PW-1051 type X-ray Diffractometer (manufactured by Philips Inc.). An intercalated graphite compound which is unstable in air would change in structure during the course of the X-ray measurement. For this reason, each of the graphite intercalation compounds is mounted on a cell in an atmosphere of argon gas and the surface thereof is covered with a thin polyethylene film (10 μm). The X-ray diffraction pattern is obtained at room temperature by radiation of cupper Kα line. Graphite intercalation compounds with different stage numbers show different X-ray diffraction patterns so that the stage number may be easily determined from the X-ray diffraction patterns.

The stability of graphite interclation compounds is measured by using four terminal platinum electrodes. That is, a GPOD film is mounted on the four terminal electrodes using a gold paste and is then reacted with an intercalant to obtain an intercalated product. The product is then exposed to air. A constant electric current (1 μA-1 mA) is applied to both of the outer sides electrodes, while measuring the change in voltage between the inner side electrodes. Since the voltage between the inner side electrodes increases with the decrease of the electrical conductivity, the change in electrical conductivity can be measured. A constant-current source (Type-225 manufactured by Kisley Inc.) is used as the electric source for the application of the constant electric current. For the measurement of the voltage, a recorder (Type-3056 manufactured by YEW Inc.) is used. GPOD films used in the examples are obtained by heat treating POD films at a temperature of 2800° C. for 1 hour. GPOD films obtained in other graphitizing conditions are confirmed to be suitably used for the preparation of graphite intercalation compounds according to the present invention.

EXAMPLE 1

A Pilex glass tube assembly having two valves as shown in FIG. 1 was prepared. A GPOD film was set in one of the valves while an alkali metal intercalant (K, Rb, Cs) was placed in the other valve. The glass tube was then evacuated to vacuum and sealed. While controlling the temperature (Ti) of the intercalant below the temperature (Tg) of the GPOD, i.e. Tg≧Ti, using two electric furnaces, the GPOD was reacted, at a temperature shown in Table 1, with the intercalant in the vapor phase to form an intercalated graphite compound. For the purpose of comparison, the above procedure was repeated in the same manner as described except that GPOD was repalced by KG. The stage number and stability of the thus obtained graphite intercalation products are summarized in Table 1. The stability shown in Table 1 is a ratio of the reduction in electrical conductivity of the GPOD intercalation compound to that of the corresponding KG intercalation compound. A smaller value is more stable and preferred.

TABLE 1

| Intercalant | Tg (°C.) | Ti (°C.) | Stage number | Stability |
|---|---|---|---|---|
| K | 280 | 250 | 1 | 0.08 |
| | 360 | 250 | 2 | 0.08 |
| | 460 | 250 | 3 | 0.12 |
| Rb | 240 | 210 | 1 | 0.08 |
| | 390 | 210 | 2 | 0.12 |
| | 460 | 210 | 3 | 0.2 |
| Cs | 220 | 195 | 1 | 0.08 |
| | 480 | 195 | 2 | 0.1 |
| | 550 | 195 | 3 | 0.08 |

As evident from the results shown in Table 1, the GPOD intercalation compounds according to the present invention have remarkably improved stability as compared with the KG intercalation compounds.

EXAMPLE 2

A GPOD film and Li metal were placed in a flask substituted with helium gas and were reacted at 200° C. in a molten state to form an intercalated graphite product. The product was found to be a mixture of a second and third stage compounds. The stability of the product relative to the corresponding KG intercalation compound was 0.15 and was markedly improved similar to that attained in Example 1.

EXAMPLE 3

Liquid ammonia was added in a flask substituted with argon gas, to which was further added Na metal for dissolution in the ammonia. Then a GPOD film was added into the flask and allowed to react at room temperature for 10 min. While feeding a stream of argon gas through the flask, the resulting GPOD film was taken out from the flask and ammonia on the surface thereof was purged away. The thus obtained film was blue in color and was found to have an approximate composition of $Na(NH_3)_2C_{12}$. This result indicates that the intercalated product is a first stage interclation compound.

EXAMPLE 4

In 100 ml of well-dried tetrahydrofuran (THF) were added 1 g of Na metal and 1 g of naphthalene and the mixture was stirred for dissolution in the THF in an argon atmosphere. A GPOD film was then immersed in the THF solution, which was blue in color, and was allowed to react for 10 min. Elemental analysis of the resulting film gave an approximate composition of $NaC_{32}(THF)_{3.2}$, showing the stage number of about 2. The stability of the intercalation compound relative to the corresponding KG interclation compound was 0.2, i.e. five times as stable as the KG intercalation compound.

EXAMPLE 5

Figure 2:
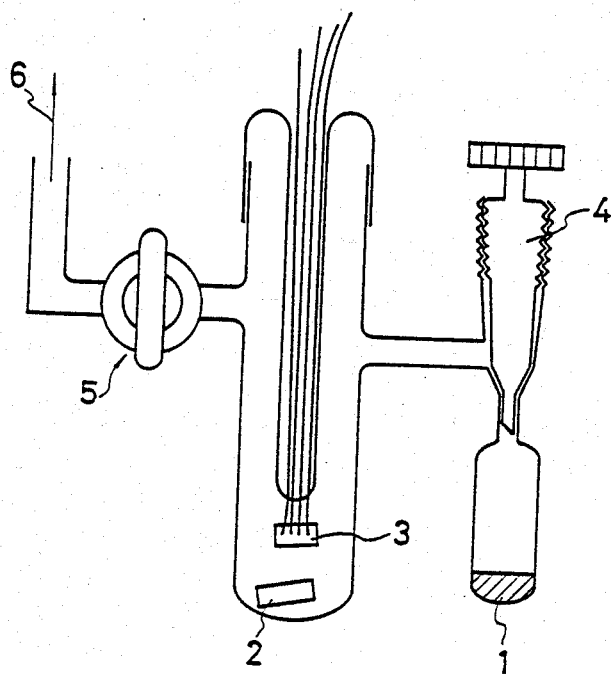
FIG. 2 is a schematic illustration of a device useful for carrying out a vapor-phase method for the preparation of graphite intercalation compounds according to the present invention.

An intercalation compound of GPOD inserted with Br intercalant was prepared using the device illustrated in FIG. 2. Thus, after the air within the device was substituted with argon gas, $Br_2$ liquid was introduced into a portion as designated as 1 and then cooled with liquid nitrogen for solidification of the $Br_2$ liquid. Thereafter, the device was evacuated to vacuum. GPOD was set at a location as shown at 2 in FIG. 2 and another GPOD was mounted to four terminal electrodes 3 provided in the device. After the evacuation, cooling of the intercalant was stopped. Thus, $Br_2$ gas was generated with the increase of the temperature, causing the reaction with the GPOD films. The change in electrical conductivity of GPOD during the reaction was monitored by means of the four terminal electrodes 3. Since the stage number of Br-GPOD intercalation compound is proportional to the ratio $(P/P_0)$ of the pressure of bromine gas (P) to the saturated pressure of the bromine gas $(P_S)$, the stage number of the Br-GPOD intercalation compound is expected to decrease as the reaction proceeds. The present experiment reveals that the composition of the intercalation compound obtained after about 5 minutes from the opening of the needle valve 4 is $C_{20}Br$, that obtained after 30 min is $C_{12}Br$ and that after 1 hour is $C_8Br$. The electrical conductivity of the intercalation compound with a composition of $C_8Br$ was $2.0 \times 10^5$ S/cm. For the purpose of comparison, Br-KG intercalation compound was prepared in the same manner as that for the preparation of the Br-GPOD intercalation compound with a composition of $C_8Br$. The stability of the Br-GPOD intercalation compound was found to be significantly improved as compared with the Br-KG intercalation compound. The relative stability was 0.025.

EXAMPLE 6

In 100 cc of well dried $H_3NO_3$ were dissolved 2 g of anhydrous $FeCl_3$, to which a GPOD film (0.3 g) was immersed and reacted at room temperature for 6 hours, thereby to obtain $FeCl_3$-GPOD intercalation compound of a second stage. The intercalated product was very stable and almost no change in electrical conductivity was observed even when the product was exposed to air for 1 month. Reactions similar to the above were carried out using as solvent $SOCl_2$ and as intercalant $AlCl_3$, $NbCl_5$ and $UCl_5$. An intercalation compound of the first stage was obtained by 96 hours reaction in the case of $UCl_5$, a second stage intercalation compound was obtained by 8 hours reaction in the case of $AlCl_3$ and a second stage intercalation compound was obtained by 12 hours reaction in the case of $NbCl_5$. Almost no change in electrical conductivity was observed when these compounds were allowed to stand in the air for 3 days.

EXAMPLE 7

A GPOD film and a metal fluoride ($MgF_2$) were placed separately in a nickel tube while preventing the direct contact therebetween. The reaction tube was evacuated to vacuum at 200° C. for 12 hours and then fluorine gas was introduced thereinto. The above evacuation and $F_2$ introduction procedure was repeated twice or more. After allowed to stand at room temperature for 24 hours, the contents in the tube were heated to 400° C. at a rate of 5° C./min and reacted at that temperature for 20 hours. X-ray diffraction pattern and elemental analysis revealed that the product is a mixture of $(C_2F)_n$ and $(CF)_n$. The electrical conductivity of the fluorinated graphite decreased as the reaction proceeded and the final product was an electrically insulating material.

EXAMPLE 8

Intercalation compounds of GPOD with $AsF_5$, $SbF_5$, fuming nitric acid and fuming sulfuric acid were prepared using the device illustrated in FIG. 2. Thus, after the air within the device was substituted with argon gas, each intercalant frozen with liquid nitrogen was placed at a position in the device as shown at 1 in FIG. 2. The device was then thoroughly evacuated to vacuum. GPOD was connected to four terminal electrodes 3 by gold paste. Another GPOD was placed at a position shown at 2. GPOD was used as a sample for measuring X-ray diffraction pattern. When the evacuation was completed, the valve 5 was closed and the device was allowed to stand at room temperature. When the temperature of the intercalant 1 was returned to room temperature, a TEFLON needle valve 4 was opened so that the intercalant was permitted to be contacted with GPOD. The electrical conductivity of GPOD was continuously measured by means of the four terminal electrodes throughout the reaction. The reaction was continued until the electrical conductivity of GPOD ceased to change. The stage number of the product was determined by measurement of X-ray diffraction patterns.

When $AsF_5$ was used as the intercalant compound, the intercalated product obtained after 3 hours reaction was a third stage compound with an electrical conductivity of $2.0 \times 10^5$ S/cm, the product after 10 hours reaction was a second stage compound with an electrical conductivity of $2.2 \times 10^5$ S/cm and the product after 48 hours reaction was a first stage compound with an electrical conductivity of $1.8 \times 10^5$ S/cm. The stability of the first stage compound relative to the corresponding KG intercalation compound was 0.06 (namely, the reduction rate of electrical resistivity was 1/16.6).

In the case of $SbF_5$, the electrical conductivity of the intercalated product after 40 hours reaction was $3.0 \times 10^5$ S/cm. The product had not uniform stage but was considered to be a mixture of first to third stage compounds. The stability of the product relative to the corresponding KG intercalation compound was 0.04.

The electrical conductivity became constant ($2.6 \times 10^5$ S/cm) after 30 min when fuming nitric acid was used as the intercalant. The product was a mixture of first to third stage compounds. The GPOD intercalated with fuming nitric acid was stable. Its electrical conductivity was scarcely changed when left in the air for 20 days. The electrical conductivity became constant ($1.5 \times 10^5$ S/cm) after 24 hours reaction in the case of fuming sulfuric acid. The stage number was not determined. The stability of the product relative to the corresponding KG intercalation compound was 0.12.

EXAMPLE 9

GPOD to which four terminal platinum electrodes were connected was immersed in sulfuric acid containing 1% of $CrO_3$ and $KMnO_4$. The electrical conductivity became maxmum ($1.5 \times 10^5$ S/cm) after 10 min and, thereafter, gradually decreased and reached $6 \times 10^4$ S/cm. The product at that point in time was regarded as being nearly a first stage compound. The stability relative to the corresponding KG intercalation compound was 0.2.

EXAMPLE 10

A GPOD film was immersed in a mixed liquid composed of equimole of concentrated nitric acid and concentrated sulfuric acid, to which was then added potassium chlorate. The mixture was reacted with gentle heating for 48 hours. The electrical conductivity was reduced as the reaction proceeded. The product became finally electrically insulating. Elemental analysis of the product gave an approximate composition of $C_8O_2(OH)_2$.

EXAMPLE 11

The K-GPOD intercalation film ($C_8K$) of the first stage structure obtained in the same manner as described in Example 1 was contacted with hydrogen at room temperature. The electrical conductivity was slightly reduced when hydrogen was introduced. After about 50 hours from the introduction of hydrogen, the conductivity was reduced to half. The hydrogen was found to intercalate into carbon layers of the film. The composition of the product was approximately $C_{28}K_3H_2$. Deuterium and benzene were found to behave similar to hydrogen.

EXAMPLE 12

A Pilex glass tube assembly having two valves as shown in FIG. 1 was prepared. A GPOD film was set in one of the valves while $FeCl_3$ or $CuCl_2$ was placed in the other valve. The glass tube was then evacuated to vacuum, sealed and heated as a whole by means of an electric oven at the temperature and for the period of time summarized in Table 2 below. The stage number and the composition of the resulting intercalted product are also shown in Table 2. The composition was determined from the change in weight caused by the intercalation on the assumption that the increment of the weight was attributed to the intercalant inserted into the graphite layers. These intercalated products were very stble and showed almost no change in electrical conductivity when exposed to air for 20 days.

TABLE 2

| Intercalant | Temperature (°C.) | Time (Hr) | Stage number | Composition |
|---|---|---|---|---|
| $FeCl_3$ | 300 | 2 | 3 + 2 | $C_{13.6}FeCl_3$ |
| | 300 | 8 | 2 | $C_{9.7}FeCl_3$ |
| | 300 | 24 | 1 | $C_{6.7}FeCl_3$ |
| $CuCl_2$ | 500 | 8 | >3 | $C_{17.5}CuCl_2$ |
| | 500 | 72 | 3 + 2 | $C_{16.7}CuCl_2$ |
| | 500 | 240 | 1 | $C_{3.8}CuCl_2$ |

EXAMPLE 13

Intercalation compounds of GPOD intercalted with $CuCl_2$, $FeCl_3$, $CoCl_2$, $MoCl_5$, $MnCl_2$ and $NiCl_2$ were prepared according to described in Example 12 and the resulting products were further reduced with $NaBH_4$. Thus, 4 g of $NaBH_4$ were added to 200 ml of aqueous KOH solution, to which was added each of the above metal halide-GPOD intercalation compounds (1.5 g). The mixture was reacted at room temperature in an atmosphere of argon gas for 8 hours with agitation. After the reaction, the product was washed with 10% HCl and then with acetone, followed by drying at 120° C. for 10 hours. Metal-GPOD interclation compounds having the same stage as that of the corersponding metal halide-GPOD intercalation compounds were obtained. That is, Fe-GPOD, Co-GPOD and Cu-GPOD intercalation compounds with first and second stage structures, Mo-GPOD intercalation compound with second and third stage structures and Mn-GPOD intercalation compound with a first stage structure were obtained.

The invention may be embodied in other specific forms without departing from the spirit or essential characteristics thereof. The present embodiments are therefore to be considered in all respects as illustrative and not restrictive, the scope of the invention being indicated by the appended claims rather then by the foregoing description, and all the changes which come within the meaning and range of equivalency of the claims are therefore intended to be embraced therein.

What is claimed is:

1. A graphite intercalation compound in the form of a film, which comprises an intercalant inserted between the aromatic layers of a graphitized film obtained by heat treatment of a polyphenyleneoxadiazole film under graphitization conditions including a temperature of at least 1600° C.

2. A graphite intercalation compound in the form of a film according to claim 1, wherein the intercalant is selected from the group consisting of Li, K, Rb, Cs, Ba, Ca, Mn, Fe, Ni, Co, Cu, Mo, K-$NH_3$, Li-$NH_3$, Rb-$NH_3$, Cs-$NH_3$, Ba-$NH_3$, Ca-$NH_3$, K-H, K-D, Li-THF, Na-THF, K-THF, K-$C_6H_6$ and K-DMSO.

3. A graphite intercalation compound in the form of a film according to claim 1, wherein the intercalant is selected from the group consisting of Br, ICl, IBr, $MnCl_2$, $MoCl_2$, $FeCl_2$, $FeCl_3$, $CuCl_2$, $NiCl_2$, $NbCl_5$, $UCl_5$, $AlCl_3$, $AsF_5$, $SbF_5$, $HNO_3$, $H_2SO_4$, $SO_3^-$ $HClO_4$ and HF.

4. A graphite intercalation compound in the form of a film according to claim 1, wherein the intercalant is selected from the group consisting of F and O.(OH).

5. A method of preparing a graphite intercalation compound in the form of a film, which method comprises the steps of:

heat treating a polyphenuleneoxadiazole film under graphitization conditions including a temperature of at least 1600° C. to obtain a graphitized film, and inserting an intercalant between the layers of the graphitized film.

* * * * *